United States Patent
Radcliffe et al.

[11] Patent Number: 6,143,253
[45] Date of Patent: Nov. 7, 2000

[54] STANDPIPE DISTRIBUTOR FOR SHORT TIME CONTACT OF HYDROCARBON COMPOUNDS WITH PARTICLES

[75] Inventors: William H. Radcliffe, Prospect Heights; Ismail B. Cetinkaya, Palatine, both of Ill.

[73] Assignee: UOP LLC, Des Plaines, Ill.

[21] Appl. No.: 09/347,957

[22] Filed: Jul. 6, 1999

Related U.S. Application Data

[62] Division of application No. 08/971,632, Nov. 17, 1997, Pat. No. 5,958,222.

[51] Int. Cl.$^7$ .............................. F27B 15/00; B01J 8/36
[52] U.S. Cl. ..................... 422/145; 422/147; 422/232; 422/234; 422/236
[58] Field of Search ................... 422/145, 147, 422/232, 234, 236

[56] References Cited

U.S. PATENT DOCUMENTS

| | | | |
|---|---|---|---|
| 2,935,466 | 5/1960 | Schoenmakers | 208/176 |
| 3,071,540 | 1/1963 | McMahon et al. | 208/163 |
| 4,434,049 | 2/1984 | Dean et al. | 208/153 |
| 4,717,467 | 1/1988 | Haddad et al. | 208/113 |
| 4,985,136 | 1/1991 | Bartholic | 208/153 |
| 5,108,583 | 4/1992 | Keon | 208/157 |
| 5,296,131 | 3/1994 | Raterman | 208/113 |
| 5,332,704 | 7/1994 | Bartholic | 502/41 |
| 5,462,652 | 10/1995 | Wegerer | 208/167 |
| 5,597,537 | 1/1997 | Wegerer et al. | 422/144 |
| 5,762,888 | 6/1998 | Sechrist | 422/216 |
| 5,858,207 | 1/1999 | Lomas | 208/113 |
| 6,010,620 | 1/2000 | Myers et al. | 208/146 |

*Primary Examiner*—Bekir L. Yildirim
*Attorney, Agent, or Firm*—John G. Tolomei; James C. Paschall

[57] ABSTRACT

An arrangement for the controlled production of an essentially linear array of hydrocarbon feed injection jets reduces required clearances and elevation while facilitating modification of the contacting locating a feed distributor containing a linear array of jets at a standpipe junction point to provide choke point for particle flow control. The flow properties of the extended particle layer are controlled by adjusting the density of the particles above the choke point created by the upper part of the standpipe inside diameter and the top of the distributor. Steam or another fluidization medium may be added to the particles directly above the distributor for this purpose. This invention can also modify the particle or feed injection characteristics by changing the projection of the distributor into the standpipe to adjust the flow area over the choke point and by the use of bottom slides or baffles to change the flow area size and configuration. Location of the distributor at a standpipe junction will also typically allow the placement of the distributor at a lower location in the process which eliminates the need to add vessel height for supplying pressure drop for the particle discharge point. The distributor arrangement also fits compactly into most common standpipe junctions. Thus, the arrangement of this invention solves the problem of inserting an extended array of feed injection points into a fluidized particle contacting process without providing a large amount of clearance or additional vessel height.

12 Claims, 9 Drawing Sheets

STANDPIPE DISTRIBUTOR FOR SHORT TIME CONTACT OF HYDROCARBON COMPOUNDS WITH PARTICLES

CROSS-REFERENCE TO RELATED APPLICATION

This application is a Divisional application of Ser. No. 08/971,632 filed Nov. 17, 1997, now U.S. Pat. No. 5,958,222, the contents of which are hereby incorporated by reference.

BACKGROUND OF THE INVENTION

This invention relates generally to the dispersing of liquids into fluidized solids. More specifically, this invention relates to a method and apparatus for dispersing a hydrocarbon-containing stream into a flowing stream of solids.

DESCRIPTION OF THE PRIOR ART

There are a number of continuous cyclical processes employing fluidized solid techniques in which an at least partially liquid phase stream containing hydrocarbon compounds contacts the fluidized solids in a contacting zone and carbonaceous or other fouling materials are deposited on the solids. The solids are conveyed during the course of the cycle to another zone where foulants are removed in a rejuvenation section or more specifically, in most cases, carbon deposits are at least partially removed by combustion in an oxygen-containing medium. The solids from the rejuvenation section are subsequently withdrawn and reintroduced in whole or in part to the contacting zone. The solids may be catalytic materials or inert solids.

One of the more important processes of this nature is the fluid catalytic cracking (FCC) process for the conversion of relatively high-boiling hydrocarbons to lighter hydrocarbons. The hydrocarbon feed is contacted in one or more reaction zones with the particulate cracking catalyst maintained in a fluidized state under conditions suitable for the conversion of hydrocarbons.

It has been a long recognized objective in the FCC process to maximize the dispersal of the hydrocarbon feed into the particulate catalyst suspension. Dividing the feed into small droplets improves dispersion of the feed by increasing the interaction between the liquid and solids. It is taught that the droplet sizes may become small enough to permit vaporization of the liquid before it contacts the solids. It is well known that agitation or shearing can atomize a liquid hydrocarbon feed into fine droplets which are then directed at the fluidized solid particles. A variety of methods are known for shearing such liquid streams into fine droplets. U.S. Pat. No. 3,071,540 discloses a feed injection apparatus for an FCC unit wherein a high velocity stream of gas, in this case steam, converges around a stream of oil upstream of an orifice through which the mixture of steam and oil is discharged. Initial impact of the steam with the oil stream and subsequent discharge through the orifice atomizes the liquid oil into a dispersion of fine droplets which contact a stream of coaxially flowing catalyst particles. U.S. Pat. No. 4,434,049 shows a device for injecting a fine dispersion of oil droplets into a fluidized catalyst stream wherein the oil is first discharged through an orifice onto an impact surface located within a mixing tube. The mixing tube delivers a cross flow of steam which simultaneously contacts the liquid. The combined flow of oil and steam exits the conduit through an orifice which atomizes the feed into a dispersion of fine droplets and directs the dispersion into a stream of flowing catalyst particles.

Other known methods for feed dispersion include specific injection methods. U.S. Pat. No. 4,717,467 shows a method for injecting an FCC feed into an FCC riser from a plurality of discharge points. U.S. Pat. No. 5,108,583 discloses a method wherein hydrocarbons and steam are supplied from individual headers and combined in conduits to supply a steam and hydrocarbon mixture to a distribution nozzle for injection into an FCC riser.

The processing of increasingly heavier feeds in FCC type processes and the tendency of such feeds to elevate coke production and yield undesirable products has led to new methods of contacting feeds with catalyst. Of particular, recent interest have been methods of contacting FCC catalyst for very short contact periods. Falling curtain type arrangements for contacting feed are known from U.S. Pat. No. 2,935,466. U.S. Pat. No. 4,985,136, the contents of which are hereby incorporated by reference, discloses an ultrashort contact time process for fluidized catalytic cracking, that contacts an FCC feed with a falling curtain of catalyst for a contact time of less than 1 second followed by a quick separation. U.S. Pat. No. 5,296,131, the contents of which are hereby incorporated by reference, discloses a similar ultrashort contact time process that uses an alternate falling catalyst curtain and separation arrangement. The ultrashort contact time system improves selectivity to gasoline while decreasing coke and dry gas production by using high activity catalyst that previously contacted the feed for a relatively short period of time. The inventions are specifically directed to zeolite catalysts having high activity. Additional arrangements for performing such feed contacting are known from U.S. Pat. Nos. 5,296,131 and 5,462,652.

The type of injection desired for short contact time arrangements pose special problems for the injection of the feed into the catalyst. Most desirably, the feed is injected by an array of identical feed injection streams that uniformly contact a stream of catalyst flowing in a compatible pattern. Typically, the uniform array of feed injection nozzles are arranged to provide a plurality of discrete jets that extend horizontally and shoot the feed into a relatively thin band of catalyst that falls in a direction perpendicular to the flow of jets. The jet array should extend over the width of the thin band—the width of the thin band is parallel to the feed and exceeds its depth. In other words, the arrangement usually creates a vertical line of catalyst that is contacted by an array of jets that extend over a horizontal line. Establishing the thin but extended band of catalyst has been thus far employed in a manner that places the band toward the center of a contacting vessel and the equipment for creating the band and jet array at the top of the contacting vessel. In turn, the nozzles that create the jets must also be located close to the band of catalyst. The previous contacting arrangements of this type that require the location of the equipment for creating the band of catalyst and the jets at the top of the vessel impose severe layout restraints. These layout restraints require additional vessel height to provide the necessary pressure drop for the fluidized catalyst to create the desired catalyst flow pattern. The equipment for creating the array of feed jets and the extended catalyst flow pattern have been cumbersome and have to a large extent dictated the overall location and arrangement of the vessels and piping for the process. In addition, it is difficult to modify the equipment to change the catalyst flow pattern and the jet array.

SUMMARY OF THE INVENTION

An object of this invention is to provide a compact and convenient method of injecting a fluid stream into contact with a patterned flow of particulate material.

Another object of this invention is reduce the elevation of equipment and the required clearances for performing short contact time contacting of vaporized liquids with a fluidized material in a flow pattern that has an extended shape.

A further object of this invention is to provide an arrangement for creating a desired particle flow pattern for contact with an array of liquid jets that facilitates modification of the particle flow pattern and the jet array.

These objects are achieved by the use of a standpipe as a location for a distributor nozzle arrangement that performs contacting of a hydrocarbon-containing stream with a falling layer of particulate material. By this invention, a uniform linear array of jets comprising liquid or mixed phase feed media is injected into an extended layer of particles produced by restricting the flow path along the standpipe. The restriction is most conveniently placed near the outlet of the standpipe into a disengaging vessel or other separator such as a cyclone. The standpipe and distributor together form a choke point for controlling particle flow. The choke point is formed by standpipe upstream of the front of the fluid distributor. The flow properties of the extended solids layer are controlled by adjusting the density of the solids above the choke point that the flow restriction creates. Steam or another fluidization medium may be added to the particles directly above the distributor for this purpose. Preferably, the contacting rapidly moves the hydrocarbon-containing liquid and particles contacting the mixture toward a separation device such that the hydrocarbons are separated from the particles after a contact time of less than 1 second, and preferably, the fluid and particle mixture enters a separation device after a contact time of from 0.5 to 0.01 seconds. This invention permits modification of the solids or fluid injection characteristics by changing the projection of the distributor into the standpipe to adjust the flow area over the choke point and by the use of bottom slides or baffles to change the flow area size and configuration of the solids flow pattern. Therefore the flow pattern of either the particles or the distribution nozzles is easily varied.

Location of the distributor in the standpipe will typically allow the discharge of the fluid and solids mixture from the distributor into a separation vessel or reactor vessel at a lower elevation than was practiced in prior art arrangements. The lower location will, in most cases, eliminate the need to add vessel height for supplying pressure drop for the solids discharge point. The distributor arrangement also fits compactly near the junction of most standpipes with a vessel or separator. Thus, the arrangement of this invention solves the problem of inserting an extended array of fluid injection points into a fluidized solids contacting process without providing a large amount of clearance or additional vessel height.

This invention may be useful for any process that seeks to contact hydrocarbon-containing streams with a fluidized particulate stream for short periods of time. The types of processes in which this invention may lee useful include the contacting of catalyst with residual feeds and the destructive contacting of high asphaltene-containing feed with high temperature inert or catalytic particles.

Accordingly, in a specific embodiment, this invention is a method of injecting a substantially linear array of fluid jets comprising an at least partially liquid phase hydrocarbon compound into a stream of fluidized particles. The method passes a fluidized stream of particles downwardly in a confined conduit into contact with a horizontally extended flow restriction located in the top or bottom of the conduit. The flow restriction confines the particles to create a horizontally extended layer of fluidized particles flowing through the conduit that extends horizontally across at least half of the inside diameter of the conduit. A fluid jet is injected to extend across at least half the horizontal width of the extended layer of particles and contacts the particle layer in a principally transverse direction within a distance downstream of the flow restriction that does not exceed the diameter of the conduit. Contact of the feed with the particles produces a mixture of fluid and particles. The process separates the mixture of fluid and particles to recover a gaseous product stream and contacted particles.

In an apparatus embodiment, this invention is an arrangement for injecting a plurality of uniform jets into an extended dispersion of moving particles within a confined conduit. The apparatus includes a particle and gas separator and a conduit for carrying a mixture of particles and gas to the separator having at least one sloped portion. A flow restriction located in the conduit upstream from the separator partially occludes the top or bottom of the conduit and has a configuration to create a horizontally extended layer of particles flowing through the conduit. A feed injector located downstream of the flow restriction and upstream of the separator creates a horizontally extended jet of fluid positioned to inject the jet of fluid substantially transversely into the flowing layer of particles.

Additional objects, embodiments and details of this invention can be obtained from the following detailed description of the invention.

DETAILED DESCRIPTION OF THE INVENTION

Figure 1:
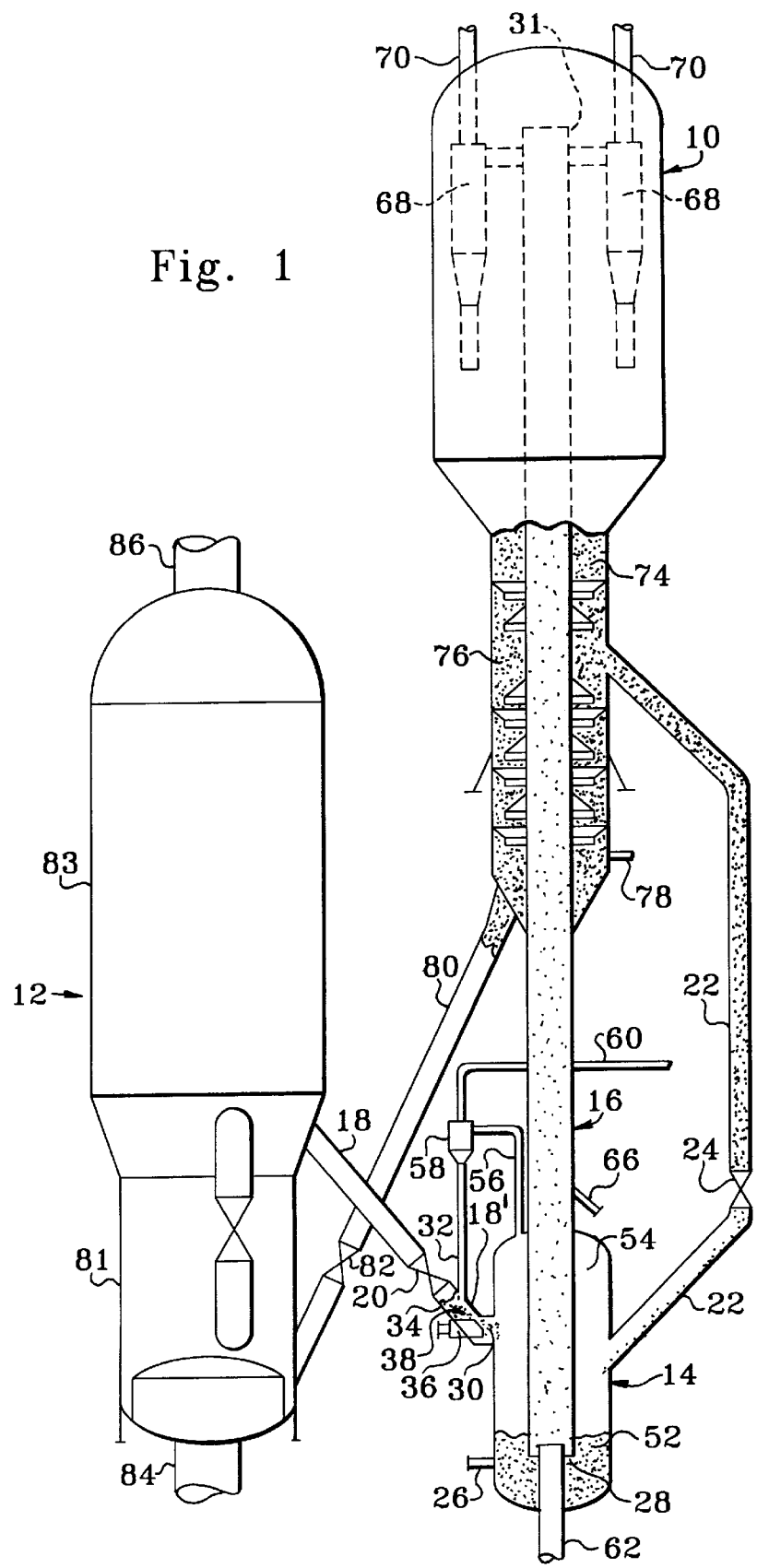
FIG. 1 is a schematic illustration of an FCC process that incorporates a short contact time arrangement of this invention.

This invention can be used in combination with any type of particulate material. The material may be inert or reactive in the presence of the particular fluid material. A wide variety of inert and catalytic material are suitable for this invention. For example, in destructive distillation processes, a suitable inert material comprises an alpha alumina. FCC applications of this process can include any of the well-known catalysts that are used in the art of fluidized catalytic cracking. These compositions include amorphous-clay type catalysts which have, for the most part, been replaced by high activity, crystalline alumina silica or zeolite containing catalysts. Zeolite-containing catalysts are preferred over amorphous-type catalysts because of their higher intrinsic activity and their higher resistance to the deactivating effects of high temperature exposure to steam and exposure to the metals contained in most feedstocks. Zeolites are the most commonly used crystalline alumina silicates and are usually dispersed in a porous inorganic carrier material such as silica, alumina, or zirconium. These catalyst compositions may have a zeolite content of 30% or more. Zeolite catalysts used in the process of this invention will preferably have a zeolite content of from 25–80 wt-% of the catalyst. The zeolites may also be stabilized with rare earth elements and contain from 0.1 to 10 wt-% of rare earths.

Suitable liquid media for this invention include any liquid stream that will enter the distributor at least partially as a liquid and is further vaporized by contact with the particulate material. Feed for the destructive distillation will use highly refractory crudes with boiling points that extend over wide ranges and high concentrations of metals and coke. For example, one typical crude has a boiling point that ranges from 240–1575° F. with more than half of the liquid volume boiling above 1000° F. For the FCC process, feedstocks suitable for processing by the method of this invention, include conventional FCC feeds and higher boiling or residual feeds. The most common of the conventional feeds is a vacuum gas oil which is typically a hydrocarbon material having a boiling range of from 650–1025° F. and is prepared by vacuum fractionation of atmospheric residue. These fractions are generally low in coke precursors and the heavy metals which can deactivate the catalyst. Heavy or residual feeds, i.e., boiling above 930° F. and which have a high metals content, are also finding increased usage in FCC units.

When applied in catalyst operations, both the metals and coke serve to deactivate the catalyst by blocking active sites on the catalysts. Coke can be removed to a desired degree by regeneration and its deactivating effects overcome. Metals, however, accumulate on the catalyst and poison the catalyst. In addition, the metals promote undesirable cracking thereby interfering with the reaction process. Thus, the presence of metals usually influences the regenerator operation, catalyst selectivity, catalyst activity, and the fresh catalyst makeup required to maintain constant activity. The contaminant metals include nickel, iron, and vanadium. In general, these metals affect selectivity in the direction of less gasoline, and more coke and dry gas. Due to these deleterious effects, the use of metal management procedures within or before the reaction zone are anticipated in processing heavy feeds by this invention.

This invention is more fully explained in the context of an FCC process. FIG. 1 shows a complex FCC arrangement that is particularly suited to the process of this invention. The description of this invention in the context of the specifically disclosed process arrangement is not meant to limit it to the details disclosed therein. The FCC arrangement shown in FIG. 1 consists of a reactor 10, a regenerator 12, a disengaging vessel 14, and an elongate riser reaction zone 16 that provides a conversion zone for pneumatically conveying catalyst and feed. The arrangement circulates catalyst and contacts feed in the manner hereinafter described.

Looking then at the disengaging vessel of FIG. 1, a regenerator conduit 18 passes regenerated catalyst at a rate regulated by a control valve 20 from regenerator 12 into contact with a carbonized catalyst from a conduit 32 to create a blended mixture of catalyst. The catalyst mixture is blended in a conduit section containing a chamber 34. The blended mixture of catalyst is discharged through a restricted flow area 38 between the inside of standpipe 18' and a distributor 36. When contacting the falling curtain of catalyst, the feed will typically have a velocity of greater than 10 ft/sec and a temperature in the range of from 300–600° F. The catalyst and feed enter vessel 14 through an inlet 30.

The primary purpose of the disengaging vessel is to provide a rapid separation of catalyst from the initially cracked vapors of the primary feed. As the catalyst and feed initially pass through inlet 30, the catalyst drops below the inlet into a dense bed 52 that is maintained in the bottom of the disengaging vessel. The top of dense bed 52 is maintained well below inlet 30 so that the heavier catalyst particles may fall quickly as the rising vapors pass into the upper portion 54 of the disengaging vessel for withdrawal through a primary feed outlet 56 and transfer to a separator 58. Carbonized catalyst recovered from separator 58 drops downwardly into catalyst recycle conduit 32 for blending with regenerated catalyst as previously described. A product line 60 withdraws the primary product from separator 58 for further separation and gas recovery.

The regenerated catalyst will have a substantially higher temperature than the carbonized catalyst. Regenerated catalyst from the regenerated conduit 18 will usually have a temperature in a range from 1100–1400° F. and, more typically, in a range of from 1200–1400° F. Once the catalyst mixture contacts the feed, the catalyst accumulates coke on the catalyst particles and has a lower temperature. The temperature of the carbonized catalyst will usually be in a range of from 900–1150° F., but its temperature will vary depending on source. In the arrangement depicted in FIG. 1, regenerated catalyst is usually blended with carbon-containing catalyst. The term "blended catalyst" refers to the total amount of solids that contact the feed and includes both the regenerated catalyst from the regenerator and the carbonized catalyst from any that has been already used in a reaction zone within the process. Preferably, the blended catalyst to feed will be in a ratio of from 10 to 20 and more preferably in ratio of from 10 to 15. The blended catalyst mixture passes over the top of a feed injector 36. Steam and the primary feed enter the injection apparatus 36 through a plurality of nozzles described more fully hereafter.

Disengaging vessel 14 can provide an additional stage of carbonized catalyst blending for the further adjustment of the catalyst-to-oil ratio in riser 16. A recycle conduit 22 passes catalyst from reactor 10 into bed 52 of disengaging vessel 14 at a rate regulated by a control valve 24. Fluidizing gas passed into disengaging vessel 14 by a conduit 26 contacts the catalyst and maintains the catalyst in a fluidized state for transport to inlet 28 of riser 16.

Dense phase conditions are generally favored in chamber 34 to provide the best distribution of the catalyst. The dense phase conditions are characterized by an apparent bulk density of the catalyst which is generally referred to as density in a range of from 15 to 35 lbs/ft$^3$. In order to maintain the desired density in the chamber 34, additional gas phase medium may be added to the catalyst above distributor 36. The additional gas phase media such as steam may enter chamber 34 from the distributor 36 or may be injected directly into standpipe 18 below slide valve 20.

Riser 16 can provide a conversion zone for additional cracking of residual feed hydrocarbons by the direct addition of regenerated catalyst to vessel 14 or riser 16. These hydrocarbons are usually of higher molecular weight than the hydrocarbons that were initially cracked by the initial ultra short contacting of distributor and standpipe arrangement 38. A fluidization material enters the inlet 28 of the riser 16 through a nozzle 62. Nozzle 62 may carry a secondary feed as well as fluidizing material into riser 16. The riser, above the point of fluidization material injection, typically operates with dilute phase conditions wherein the density is usually less than 20 lbs/ft$^3$ and, more typically, is less than 10 lbs/ft$^3$. A secondary feed may also be introduced into the riser somewhere between inlet 28 and substantially upstream from an outlet 31 through an inlet nozzle 66.

The catalyst and additional reacted feed vapors are then discharged from the end of riser 16 through an outlet 31 and separated into a product vapor stream and a collection of catalyst particles covered with substantial quantities of coke and generally referred to as spent catalyst. A separator, depicted by FIG. 1 as cyclones 68, removes catalyst particles from the secondary product vapor stream to reduce particle concentrations to very low levels. Product vapors comprising cracked hydrocarbons and trace amounts of catalyst exit the top of reactor vessel 10 through conduits 70. Catalyst separated by cyclones 68 returns to the reactor vessel into a dense bed 74.

Primary and secondary products are typically transferred to a separation zone for the removal of light gases and heavy hydrocarbons from the products. Product vapors enter a main column (not shown) that contains a series of trays for separating heavy components such as slurry oil and heavy cycle oil from the product vapor stream. Lower molecular weight hydrocarbons are recovered from upper zones of the main column and transferred to additional separation facilities or gas concentration facilities.

Catalyst drops from dense bed 74 through a stripping section 76 that removes adsorbed hydrocarbons from the surface of the catalyst by countercurrent contact with steam. Steam enters the stripping zone 76 through a line 78. Spent catalyst stripped of hydrocarbon vapors leave the bottom of stripper section 76 through a spent catalyst conduit 80 at a rate regulated by a control valve 82 and enters regenerator 12.

The process can use any type of regeneration for the removal of coke. Coke removal from the regenerated catalyst will ordinarily operate to completely remove coke from catalyst is generally referred to as "complete regeneration". Complete regeneration produces a catalyst having less than 0.1 and preferably less than 0.05 wt-% coke. In order to obtain complete regeneration, oxygen in excess of the stoichiometric amount necessary for the combustion of coke to carbon oxides is charged to the regenerator. Excess oxygen charged to the regeneration zone will react with carbon monoxide produced by the combustion of coke, thereby yielding a further evolution of heat. Different arrangements and means for operating of regenerators are known to effect combustion of CO to various degrees and the removal of any excess heat. Heat must be controlled because there are limitations to the temperatures that can be tolerated by FCC catalyst without having a substantial detrimental effect on catalyst activity. Generally, with commonly available modern FCC catalyst, temperatures of regenerated catalyst are usually maintained below 760° C. (1400° F.) since loss of activity would be very severe at about 760–790° C. (1400–1450° F.).

In the regeneration process depicted by FIG. 1, conduit 80 transfers spent catalyst to combustor style regenerator 12. The spent catalyst undergoes the typical combustion of coke from the surface of the catalyst particles by contact with an oxygen-containing gas. The oxygen-containing gas enters the bottom combustor 81 of the regenerator via an inlet 84 and maintains a fast fluidized zone in the combustor. The fast fluidized conditions establish an upward catalyst transfer velocity of between 8 to 25 ft/sec in a density range of from 4 to 34 lbs/ft$^3$. Combustion of coke from catalyst particles continues through an internal riser (not shown) that transfers catalyst to an upper disengaging vessel 83. Residence time through the combustor and riser will usually provide sufficient reaction time to completely combust coke and fully regenerate the catalyst, i.e. removal of coke to less than 0.2 wt-% and preferably less than 0.1 wt-%. Catalyst discharged from the riser passes through a dense fluidizing bed of catalyst (not shown). Flue gas consisting primarily of CO or $CO_2$ passes upward and enters disengaging vessel 83 of regeneration vessel 12. A separator, such as the cyclones previously described for the reactor vessel or other means, removes entrained catalyst particles from the rising flue gas before the flue gas exits the vessel through an outlet 86. Combustion of coke from the catalyst particles raises the temperatures of the catalyst to those previously described for catalyst withdrawn by regenerator standpipe 18.

Figure 2:
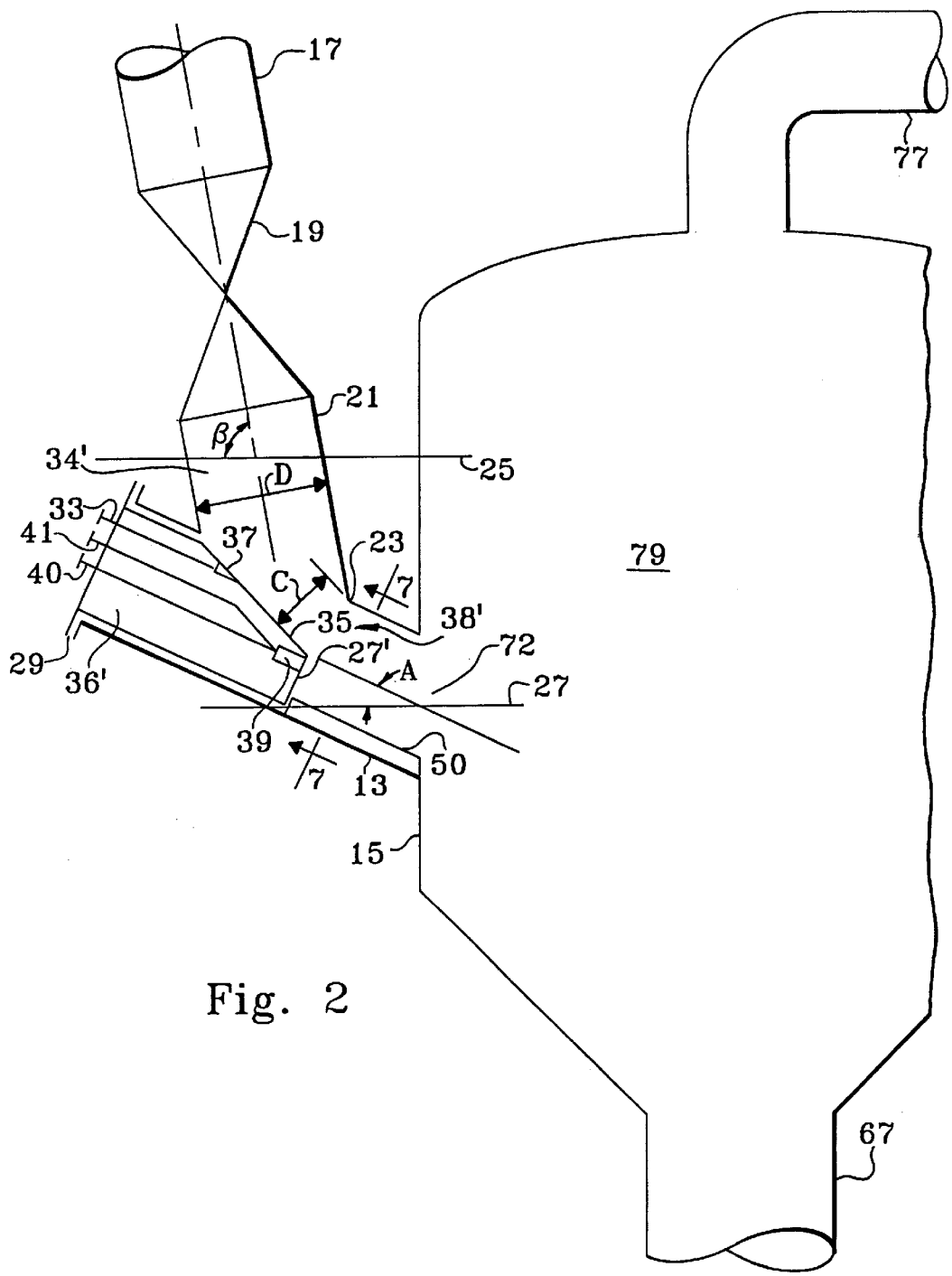
FIG. 2 is a schematic view of a distributor of this invention in a standpipe conduit near a separator.

Looking then more closely at the standpipe and feed injection arrangement of this invention, FIG. 2 shows a distributor 36' similar to that shown in FIG. 1 in a standpipe and distributor configuration that defines flow restriction 38'. Distributor 36' is retained in a standpipe section 13. Distributor 36' projects into standpipe section 13 that carries a mixture of catalyst and gas into a separation vessel 15. Catalyst for discharge into vessel 15 enters a standpipe portion 17 from a regeneration zone upstream of a slide valve 19. Slide valve 19 regulates a controlled flow of catalyst into a standpipe section 21. Standpipe sections 13 and 21 are joined by a junction. Standpipe section 21 has a principally vertical axis that makes an angle, as represented by letter B, with a horizontal axis 25 in a typical range of from 30° to 90°. The slope of conduit section 13 decreases relative to conduit section 21 and typically makes an angle A in a range of from 0° to 45° with a horizontal axis 27. A flange 29 at the end of conduit section 13 retains distributor 36' in the standpipe.

A sloped surface 35 on the top of distributor 36' together with the corner of junction 23 defines a choke point having transverse flow dimension C as indicated in FIG. 2. The distance C is ordinarily sized such that the choke point will have an open flow area that equals approximately 50 to 80% of the normal open flow area of conduits 21 or 13 as measured across their open interior diameter as indicated by letter D in FIG. 2.

The amount of catalyst and its flow characteristics across the choke point having dimension C is controlled by varying the rate of catalyst flowing through valve 19 as well as the density of the catalyst in chamber 34'. The density of the catalyst in chamber 34' can be adjusted to be within the aforementioned ranges by the addition of steam from a nozzle 33 through a steam outlet 37 located in the upper surface 35 of the distributor 36'. The flow rate is preferably adjusted to provide a relatively dense extended layer of catalyst that flows downwardly across the choke point having dimension C and into substantially transverse contact with feed leaving the distributor through nozzles 39. For the purposes of this description, the expression "transversely contacting" means the feed does not flow parallel to the direction of the falling curtain. The expression "substantially transverse contact" is used to describe the case where the principal direction of catalyst flow has an included angle of at least 30° and preferably at least 45° between the principal direction by which nozzles 39 inject the feed into the layer of catalyst. The layer of catalyst will extend at least half way across the upper surface 35 of the feed injector 36' and more preferably across substantially the entire width of upper surface 35. Nozzles 39 will extend horizontally across at least half the width of the catalyst layer created by its flow through the choke point and more preferably across substantially the entire width. Feed distributor 36' will typically have an oil injection nozzle 40 for injecting all oil through the nozzles 39 and an atomization connection for introducing an atomization fluid with the oil, if desired, through a nozzle 41. The atomization fluid in most cases is steam.

Figure 3:
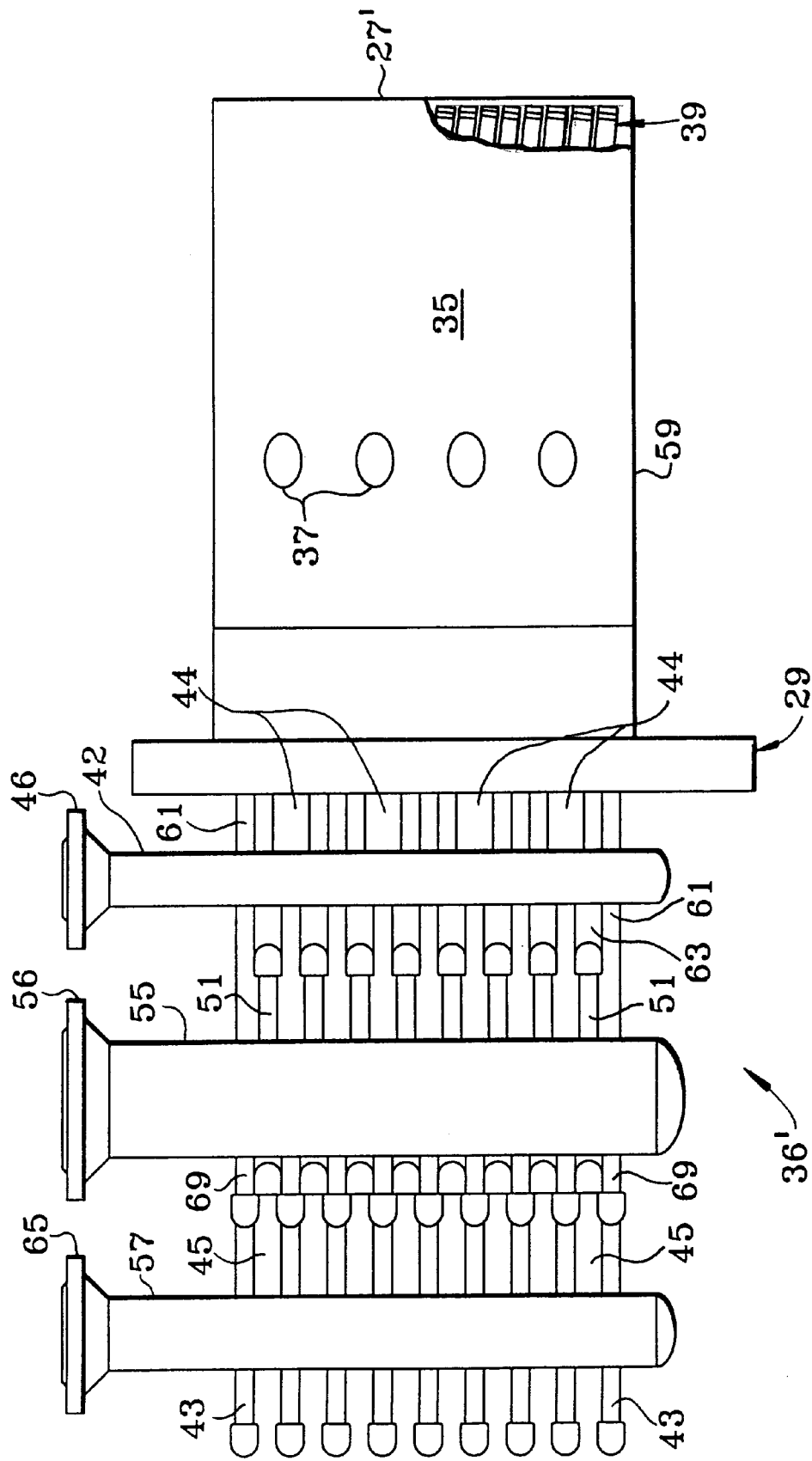
FIG. 3 is a top view of a distributor for use in the arrangement of this invention.
Figure 4:
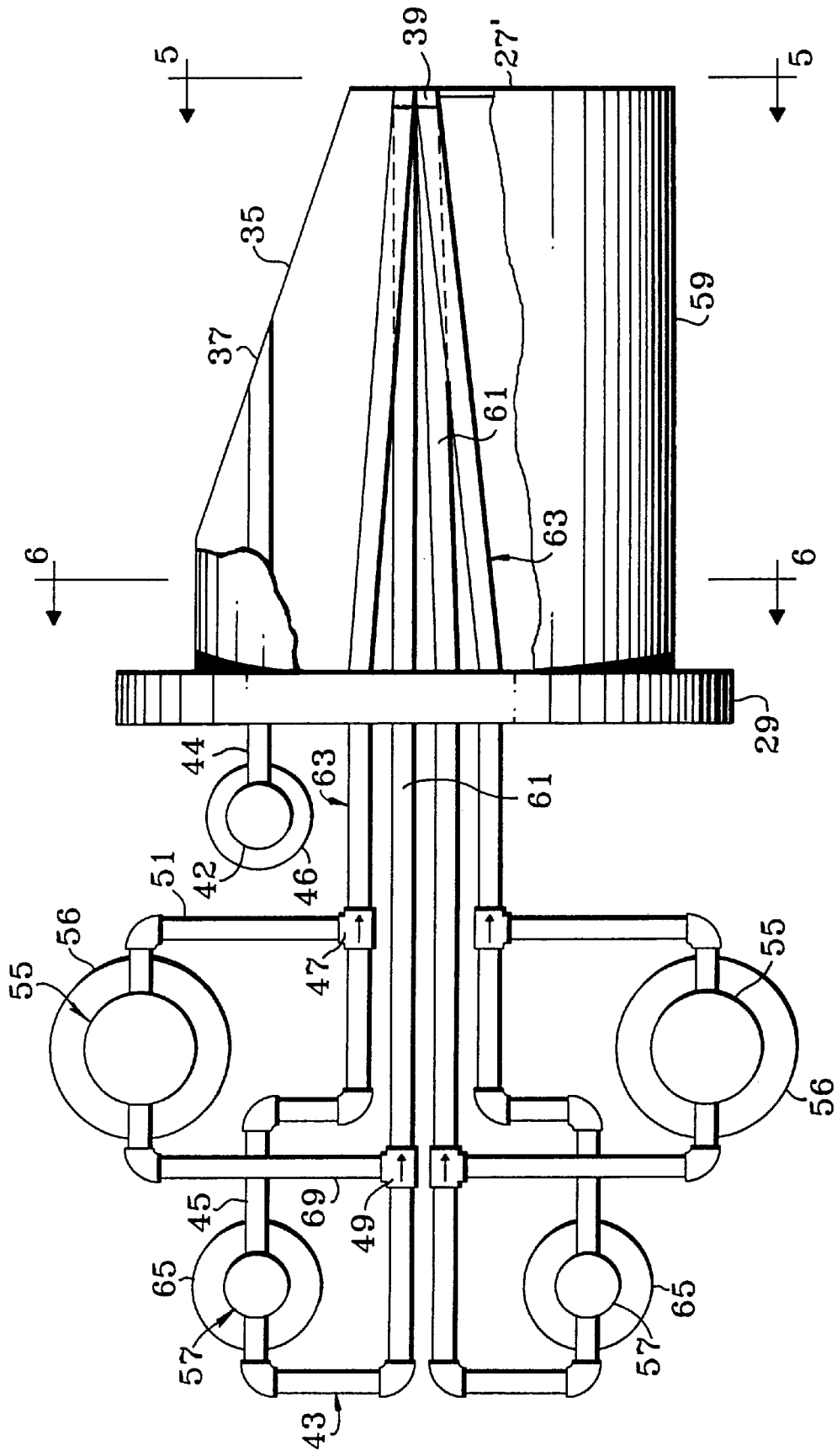
FIG. 4 is a partial section showing a side view of the distributor of FIG. 3.

A suitable nozzle arrangement and piping arrangement for supplying feed and atomization fluid to the nozzles is shown more clearly in FIGS. 3 and 4. FIGS. 3 and 4 show feed distributor 36' with piping for injecting feed and atomization fluid from nozzles 39 and fluidizing gas from openings 37 on sloped surface 35. FIG. 3 is a top view of the distributor showing a plurality of nozzles for injecting the liquid and gaseous dispersion into contact with the falling layer of catalyst. The nozzles 39 are orientated to inject an atomized mixture of fluids directly out from distributor 36' in a straight flow pattern from nozzles 39. Nozzles 39 may be angled to orient the injected atomized liquid over a wider pattern and to maintain an even spacing between jets created thereby. The nozzles 39 may be angled in this manner to cover any length or configuration of particular flow pattern of the catalyst dispersion that they contact.

The nozzles 39 creating the jets are typically sized to provide a fluid velocity out of openings of least from 30 ft/sec. In accordance with typical FCC practice, the feed exits the nozzle openings 39 as a spray of fine droplets. Droplet size within the spray and the velocity of the spray determines momentum of the feed as it enters the interior of separation vessel 15. It is difficult to increase the momentum of the feed above a given level since the velocity of the feed injection is inversely proportional to the size of the droplets in the emanating spray. Higher velocities for the spray tend to directly increase the momentum of the spray but indirectly decrease the momentum by reducing the size of the exiting droplets. Conversely the reduced momentum that results directly from lower spray velocities is offset by the typical production of larger droplets. Where a principally liquid stream exits the nozzles 39, the velocity of the vapor will typically be in a range of from 30 to 75 ft/sec.

The dispersion of the feed into yet finer droplets is promoted by imparting sufficient energy into the liquid. Where desired, any of the prior art methods may be used in combination with the feed injection arrangement of this invention. For example, this invention may be practiced with some addition of a gaseous diluent such as steam to the feed before discharge through the orifices. The addition of the gaseous material will aid in the atomization of the feed. When employed, the quantity of gaseous material typically combined with the feed before its discharge through the nozzles is equal to about 0.2 wt-% of the combined liquid and gaseous mixture. Atomization will for most liquids produce droplets in a size range of from 50 to 750 microns. The additional energy and smaller droplet size associated with the use of the atomization gas will normally result in higher exit velocities from the nozzles. Such velocities may be up to 150 ft/sec.

The nozzles 39 are retained by an extended shroud 59 that guides the ends of the nozzles at an inner face of the shroud that extends into conduit 13. The flange 29 forms the outer end of the shroud through which mixture conduits 61 and 63 extend. Flange 29 is a blind flange that is preferably bolted to a similarly open flange in conduit 13 to thereby facilitate insertion and removal of distributor 36'.

Conduits 61 and 63 carry a combined mixture of the liquid and gas to nozzles 39. Shroud 59 has its top closed by surface 35 and is overall a closed structure that provides sufficient rigidity to prevent vibration or damage of the conduits 61 and 63 inside conduit 13. Preferably shroud 59 contains insulating material therein to reduce the temperature of the distributor 36' at the outer end of conduit 13.

The liquid and the gaseous components of the mixture are transferred to conduits 61 and 63 by the liquid manifold 55 and the gas manifold 57, respectively. Headers 55 carry feed and are optionally mixed with an additional gas phase atomization medium, in this case steam, from headers 57. The liquid or feed entering the distributor 36' through manifold 55 will usually have a temperature below its initial boiling point but a temperature above the boiling point of any steam or gaseous medium that enters the distribution device 36' along with the liquid. Both manifolds 55, 57 have a suitable connection 56, 65 for receiving separate supplies of liquid and gas from a suitable source. Manifold 55 delivers liquid to nozzles 39 through liquid conduits 69 and liquid conduits 51 that supply liquid to mixture conduits 61 and 63, respectively. Gas header 57 supplies gas to combined conduits 61 and 63 through gas conduits 43 and 45, respectively. FIGS. 3 and 4 also show a manifold 42 having a connection 46 for receiving of fluidized medium such as steam to be distributed out of the upper surface 35 of the distributor through holes 37 via conduits 44.

The piping configuration of FIG. 3 is more clearly disclosed in FIG. 4 that shows a horizontal view of distributor 36'. On the liquid side, manifold 55 supplies liquid to conduit 51 which flows perpendicularly into shearing admixture with gas from conduit 45 through a "T" 47. The combined flow from conduits 41 and 45 enter conduit 63 which passes through blind flange 29 into shroud 59. Conduit 63 is angled downwardly to provide a combined mixture of liquid and gas to injection nozzles 39 which are located just inside of the face 27' of shroud 59. In a similar manner, manifold 55 also supplies liquid to a conduit 69 which again perpendicularly discharges the liquid into shearing contact with gas provided by header 57 through conduit 43 into a "T" 49. "T" 49 supplies liquid into conduit 61 which again is fixed to and passes through blind flange 29. "T"s 47 and 49 may be designed to provide a pressure drop to either the gas or the liquid mixtures. The pressure drop will serve to equalize flow out of the headers into each conduit 61 or 63. Face 27' of shroud 59 fixes the distal ends of conduits 61 and 63 either directly or through nozzle 39. The lower set of manifolds 55 and 57 again supply liquid and gas to conduits 61 and 63 to supply gas and liquid to a lower set of nozzles 39 in the manner just described.

The arrangement of the nozzles 39 is further illustrated in Section 5—5 of FIG. 4.

Figure 5:
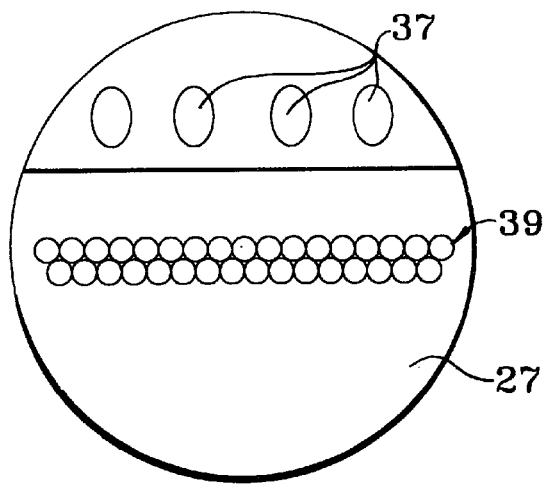
FIG. 5 is a section of the distributor of FIG. 4 taken across lines 5—5.
Figure 6:
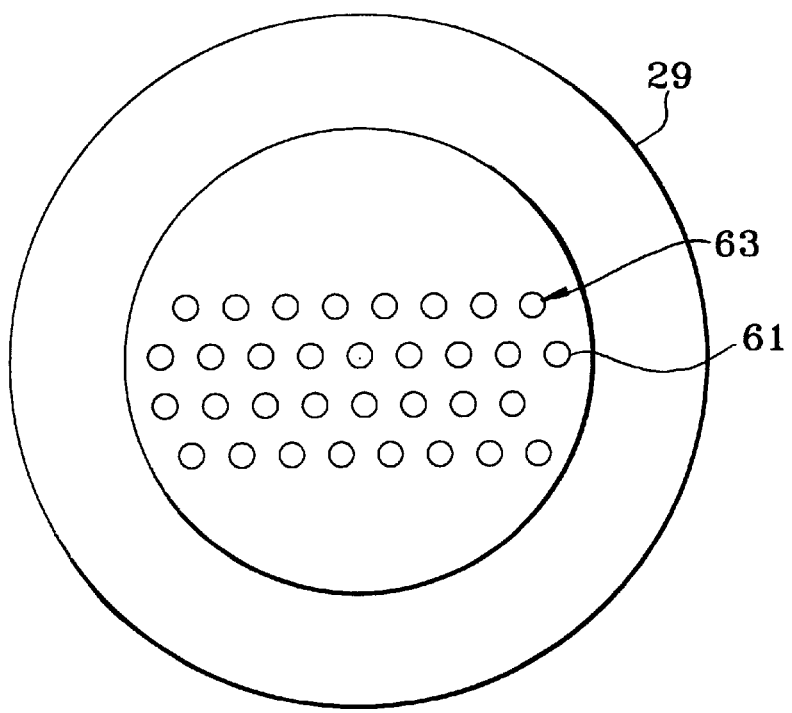
FIG. 6 is a section of the distributor of FIG. 4 taken across lines 6—6.

As shown in FIG. 5, the nozzles 39 provide a primarily linear array in upper and lower rows. All of the nozzles are offset to provide a broad band of linear feed contacting in a desired flow pattern. Nozzles 39 may be designed to provide any desired flow pattern of dispersed and atomized liquid out of each nozzle. The nozzles may have an outlet configuration that provides a concentrated cylindrical jet. The invention is also not limited to any particular nozzle arrangement and may use a single row of nozzles or a single extended slot to inject feed.

An intermediate portion of pipes 61 and 63 are also fixed into blind flange 29 as shown by Section 6—6 of FIG. 4. Pipes 63 and 61 are offset from each other in two rows to facilitate the attachment to blind flange 29 and to provide clearance for the outer piping configuration that supplies liquid and gas from headers 55 and 57 to each individual pipe 61 and 63. A rigid attachment of pipes 61 and 63 to blind flange 29 also supports the outer piping of distributor 36'.

A typical arrangement for distributor 36' will use nominal two-inch pipe for all of the gas and liquid conduits and the combined conduits that supply the gas and liquid to nozzles 39. The nozzles receiving the mixture of gas and liquid will also have a similar nominal pipe size with a restricted orifice opening at its end to provide the concentrated jet. Suitable orifice openings for the jet will have a configuration that provides the desired flow path out of the jet. A preferred flow path is provided by an elliptical opening. The number of nozzles used will be selected to provide the desired dimensions and arrangement of the jet array injected by the distributor. The nozzles 39 may also use standard or custom designed spray nozzles.

Figure 7:
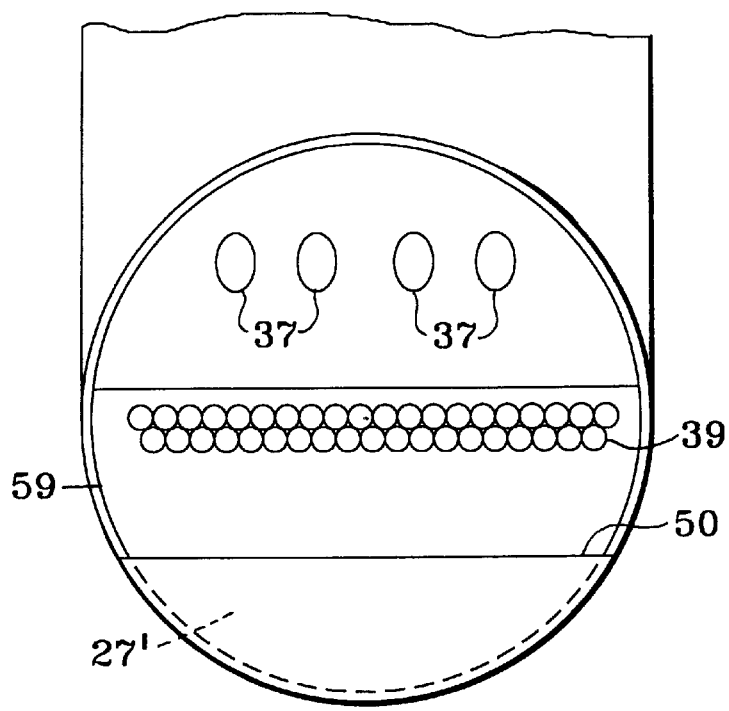
FIG. 7 is a section of the distributor of FIG. 2 taken across lines 7—7.

Once distributor 36' has injected the feed into contact with the falling layer of catalyst, the uniformity of the flow may be further improved by the use of baffles or slides downstream of the feed injection nozzles 39. FIG. 2 shows a baffle 50 located immediately downstream of the feed injection nozzles 39 and ending at inlet 72 of vessel 15. The configuration of baffle 50 is more clearly shown in FIG. 7. As FIG. 7 clarifies, baffle 50 is located below nozzles 39 and covers a portion of the face 27' of shroud 59.

Figure 8:
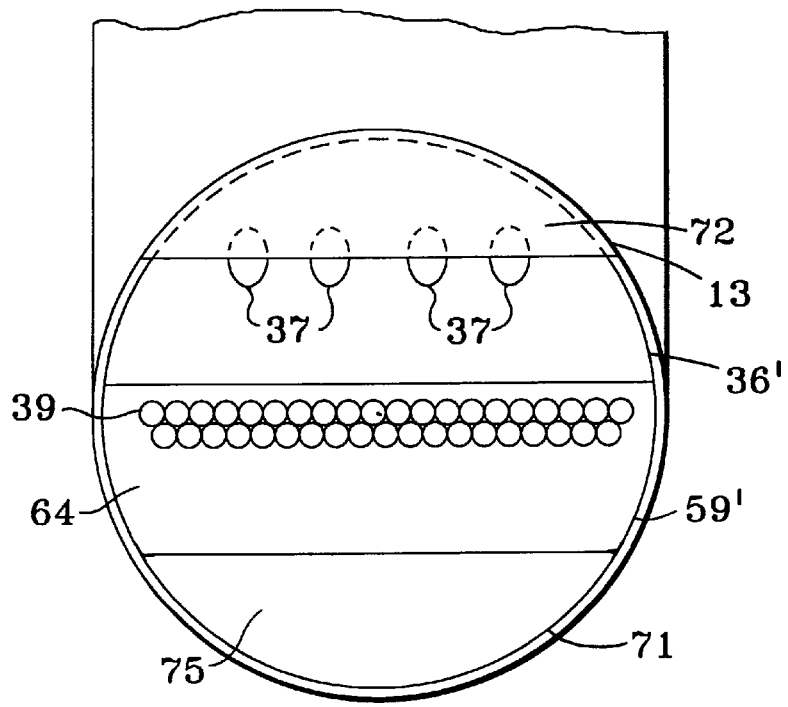
FIG. 8 is modified view of the section of FIG. 7.

FIG. 8 illustrates a further variation in the arrangement of the conduit cross-section and the distributor configuration. FIG. 8 shows distributor 36' having a modified shroud 59' that extends a baffle 71 from the face 64 in which nozzles 39 are retained. Baffle 71 ends with a slanted face 75. FIG. 8 also shows an upper baffle 72 formed in an upper portion of conduit section 13 to provide further control of the catalyst as it goes through the choke point so that a more uniform layer is obtained.

Figure 9:
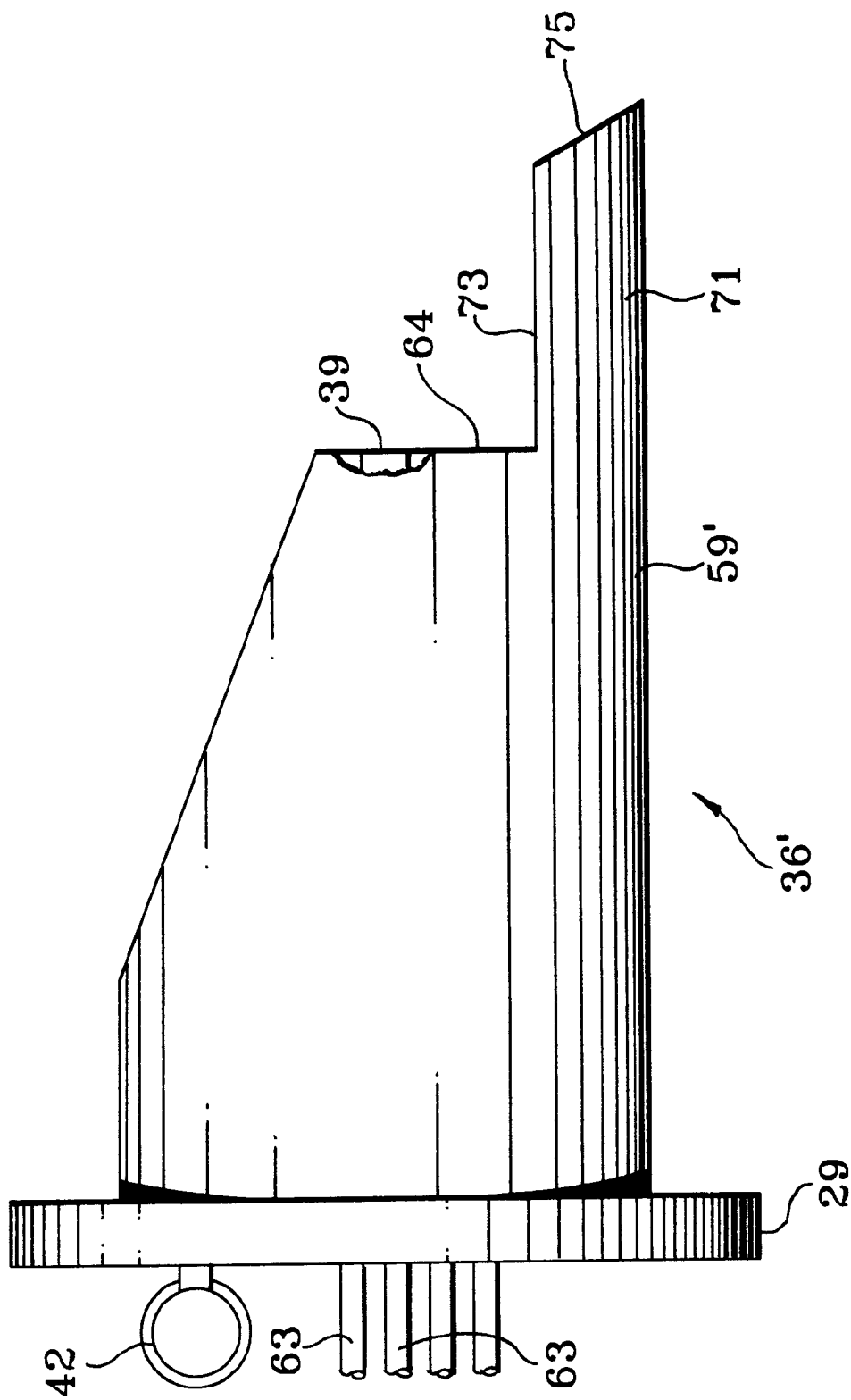
FIG. 9 is side view of the modified section of FIG. 8.

FIG. 9 shows a side view of the modified shroud 59' of distributor 36'. Baffle portion 71 has a flat portion 73 located below nozzles 39 and extends outwardly to a face 75 that ends at or about the inlet 72 of separator 15.

Again, separator vessel 15 may be any type of separator that will preferably provide a quick separation between the catalyst and the vapors entering therein. Separator 15 may contain internals for distribution of a stripping gas or other fluid to improve the recovery of product vapors entering from conduit 13. The separation vessel may contain cyclone separators into which conduit 13 directly discharges the mixture of catalyst and vapors. However, cyclone separators are not a necessary part of this invention. This invention can use any arrangement of separators to remove spent catalyst from the product stream. Separated catalyst leaves the bottom of separator vessel 15 through a lower nozzle 67 while recovered vapors pass overhead out of the separation vessel through a nozzle 77. The vapor and catalyst are discharged into the interior 79 of separation vessel 15. Preferably the outlets for nozzles 39 are located close to outlet 72 to minimize the additional contact time in the catalyst conduit.

Figure 10:
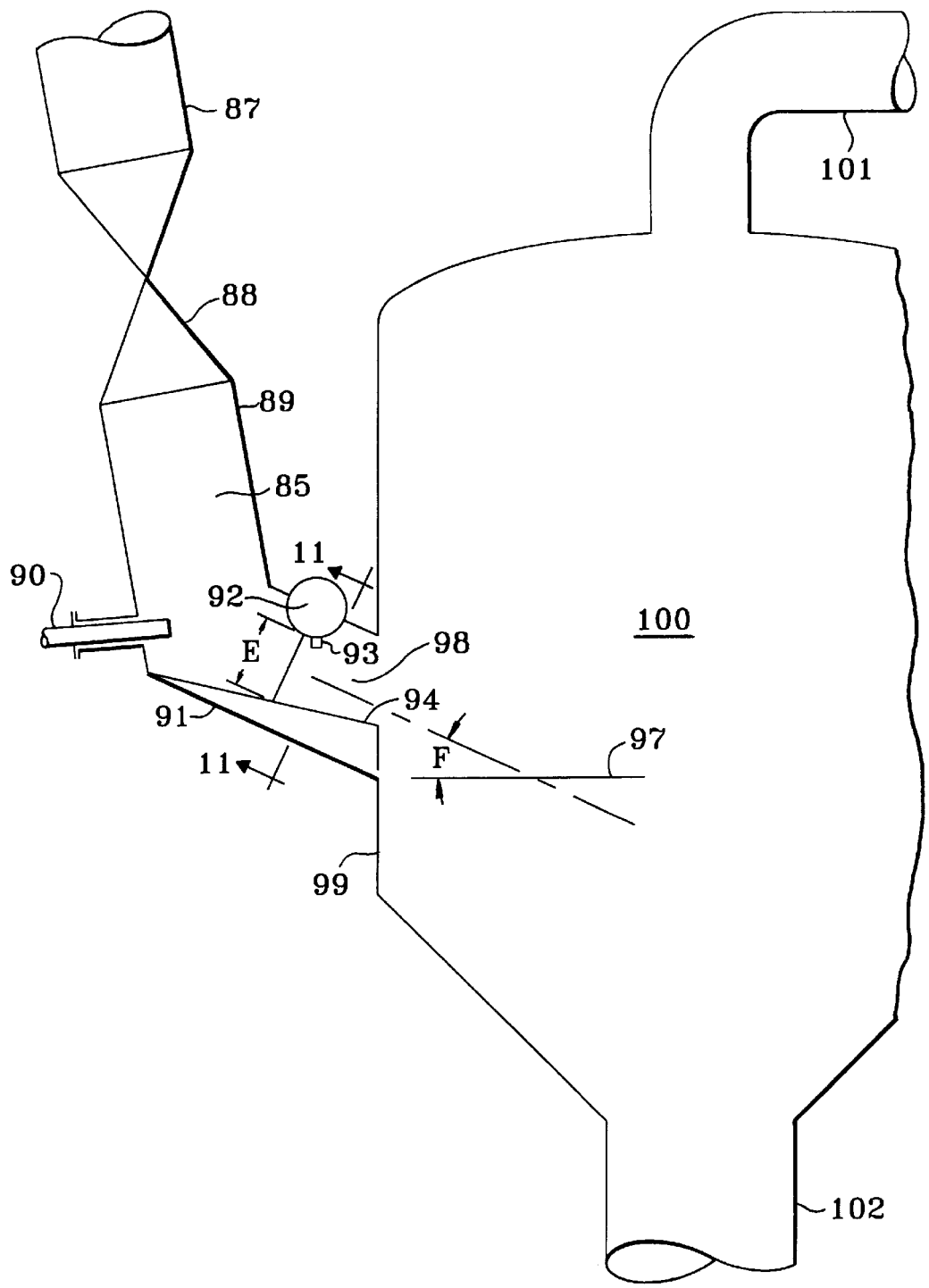
FIG. 10 is a schematic view of a modified distributor of this invention in a standpipe conduit and the separator of FIG. 2.

FIG. 10 shows an alternate arrangement for distribution of feed in a catalyst standpipe or conduit. In this arrangement, a slide valve 88 regulates the flow of regenerated catalyst into a conduit section 89 from standpipe section 87. In the manner previously described, the density of the catalyst in conduit section 89 is controlled by the addition of steam or other fluidizing medium into the interior 85 of the conduit through a nozzle 90. Catalyst flows out of section 8:5 and through a choke point having a dimension E in a lower section 91 of the conduit. The choke section is formed by a flow restrictor 92 that extends transversely across the conduit and has nozzles 93 for injecting a distributed liquid feed into a flowing stream of catalyst.

Figure 11:
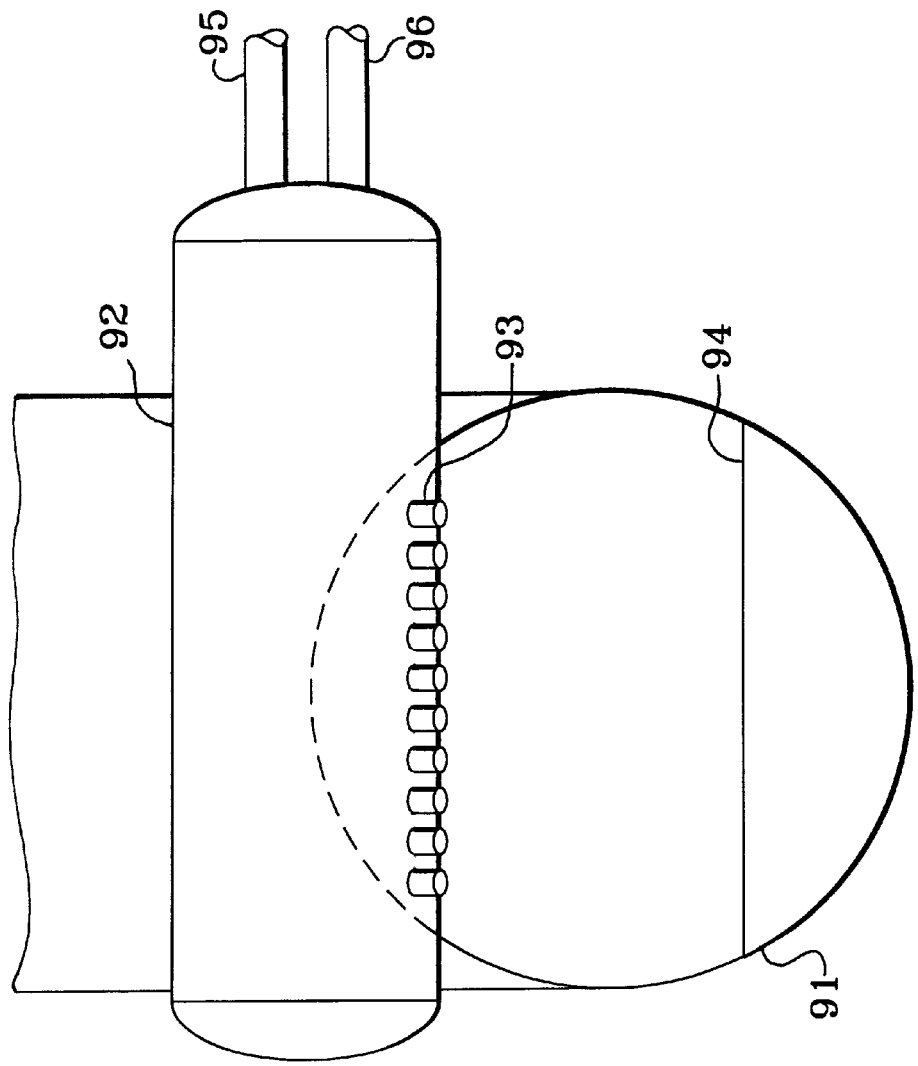
FIG. 11 is a section of FIG. 10 taken at lines 11—11.

The transverse arrangement of manifold 92 is more clearly shown in FIG. 11 which is a section taken at lines 11—11 in FIG. 10. The bottom of the choke point having the dimension E is defined by a lower slide 94 that provides a flat portion across the bottom of conduit section 91. The slide creates a relatively uniform layer of catalyst into which the dispersed liquid is injected. Liquid enters manifold 92 from a nozzle 95. Additional gaseous fluids may be added through a nozzle 96 to provide additional atomization for the liquid exiting through nozzles 93.

In a preferred arrangement, flow restrictor 92 may comprise an outer pipe that receives an inner pipe. The inner pipe will contain a row of nozzles 93. The outer pipe will have a slot on its bottom side through which nozzles 93 are downwardly directed. This arrangement facilitates the replacement of the nozzles and the changing of the nozzles to suit different flow conditions by simple withdrawal and insertion of the inner pipe through an appropriate flanged connection.

Looking again at FIG. 10, the center line of conduit section 91 has an angle F that typically lies in a range of from 30° to 60°. The angle in conduit section 91 promotes smooth flow of the catalyst layer out of the conduit section. Some minimal angle from the horizontal axis 97 is necessary to provide smooth flow of catalyst without the addition of excessive fluidizing medium. Likewise some angle from the vertical is necessary so that the uniform layer of catalyst is formed on a bottom surface of the standpipe section 91 and so that the dispersed liquid feed can be injected transversely into the catalyst layer. Thus, if angle F is too shallow, catalyst will not move in a uniform layer and if angle F is too steep, the injection of feed will produce a cocurrent feed flow with the catalyst. Nozzles 93 are preferably located near the inlet 98 of separation vessel 99. Preferably the feed is not more than one conduit diameter away from inlet 98. The interior 100 of separation vessel 99 may again contain means for facilitating rapid separation of the vapors from the catalyst. An overhead nozzle 101 withdraws vapors for further separation and recovery of specific product streams. Catalyst for recycle or regeneration is withdrawn from conduit 102.

We claim:

1. An apparatus for injecting a plurality of uniform jets into an extended dispersion of moving particles within a confined conduit, apparatus comprising:
   a particle and gas separator;
   a conduit for carrying a mixture of particles and gas to the separator having at least one sloped portion;
   a flow restriction located in the conduit upstream from the separator and partially occluding the top or bottom of the conduit having configuration to create a horizontally extended layer of particles flowing through the conduit; and,
   a feed injector located downstream of the flow restriction and upstream of the separator for creating a horizontally extended jet of feed and positioned to inject the jet of feed substantially transversely into the flowing layer of particles.

2. The apparatus of claim 1 wherein a gas tap communicates with a portion of said conduit upstream of said flow restriction for adding gas therein.

3. The apparatus of claim 1 wherein a flat baffle is located in the conduit downstream of the flow restriction.

4. The apparatus of claim 1 wherein the distance along the conduit from the feed injector to the separator does not exceed the inside diameter of the conduit.

5. The apparatus of claim 1 wherein a distributor provides the feed injector and the flow restriction.

6. The apparatus of claim 1 wherein the open area of the conduit at the flow restriction is reduced to a range of from 50 to 80% of the open area of the conduit immediately upstream or downstream of the flow restriction.

7. An apparatus for injecting a plurality of uniform jets into an extended dispersion of moving particles within a confined conduit, apparatus comprising:

a particle and gas separator;

a conduit for carrying a mixture of particles and gas to the separator having a junction point where the slope of the conduit decreases downstream of the junction such that the axis of the conduit upstream of the junction makes an angle of from 30 to 90 degrees with the horizontal and axis of the conduit downstream of the junction makes and angle of 0 to 45 degrees with the horizontal; and, a distributor defining an upper surface below the junction point that defines a flow restriction between the junction point and the upper surface that partially occluding the bottom of the conduit, the upper surface having a configuration to create a horizontally extended layer of particles flowing over the distributor and transversely to the face of the distributor and defining at least one opening for injecting a horizontally extended jet of feed across the face of the distributor.

8. The apparatus of claim 7 wherein a gas tap communicates with a portion of conduit upstream of the distributor for adding gas therein.

9. The apparatus of claim 7 wherein a flat baffle is located in the conduit downstream of the distributor.

10. The apparatus of claim 1 wherein the open area of the conduit at the flow distributor is reduced to a range of from 50 to 80% of the open area of the conduit immediately upstream or downstream of the flow distributor.

11. An apparatus for injecting a plurality of uniform jets into an extended dispersion of moving particles within a confined conduit, apparatus comprising:

a particle and gas separator;

a sloped conduit having an angle of 30 to 60 degrees from the horizontal axis for carrying a mixture of particles and gas to the separator; and, a distributor located in the top of the conduit upstream from the separator and partially occluding the top of the conduit having configuration to create a horizontally extended layer of particles flowing through the conduit and defining at least one opening for injecting a horizontally extended jet of feed downwardly into the flowing catalyst layer.

12. The apparatus of claim 11 wherein a gas tap communicates with a portion of conduit upstream of the distributor for adding gas therein.

* * * * *